United States Patent [19]

Rozman et al.

[11] Patent Number: 5,047,699

[45] Date of Patent: Sep. 10, 1991

[54] VSCF START SYSTEM MOTOR CURRENT ESTIMATOR

[75] Inventors: Gregory I. Rozman; Vijay K. Maddali, both of Rockford, Ill.

[73] Assignee: Sundstrand Corporation, Rockford, Ill.

[21] Appl. No.: 371,078

[22] Filed: Jun. 26, 1989

[51] Int. Cl.[5] .............................................. H02P 7/06

[52] U.S. Cl. ................................... 318/254; 318/431; 318/432

[58] Field of Search ............... 318/138, 254, 430, 431, 318/439, 714, 715, 721, 722, 799, 800, 801, 802, 803, 823, 432, 433

[56] References Cited

U.S. PATENT DOCUMENTS

| | | | |
|---|---|---|---|
| 3,969,659 | 7/1976 | Thode | 318/823 |
| 4,230,979 | 10/1980 | Espelage et al. | 318/721 |
| 4,240,020 | 12/1980 | Okuyama et al. | 318/721 |
| 4,262,241 | 4/1981 | Azusawa | 318/722 X |
| 4,451,771 | 5/1984 | Nagase et al. | 318/802 X |
| 4,455,522 | 6/1984 | Lipo . | |
| 4,479,082 | 10/1984 | Schauder et al. | 318/799 |
| 4,484,129 | 11/1984 | Ono . | |
| 4,525,660 | 6/1985 | Katto . | |
| 4,543,520 | 9/1985 | Danz et al. . | |
| 4,546,293 | 10/1985 | Peterson et al. | 318/138 X |
| 4,686,437 | 8/1987 | Langley et al. | 318/254 |
| 4,689,543 | 8/1987 | Hucker . | |
| 4,707,618 | 11/1987 | Haas . | |

*Primary Examiner*—Bentsu Ro

*Attorney, Agent, or Firm*—Wood, Phillips, Mason, Recktenwald & VanSanten

[57] ABSTRACT

The problem of excess size and weight resulting from the use of current sensors in a VSCF start system (10) is solved by a motor control (22) which utilizes a current estimator (68) to develop a current feedback value. The current estimator (68) is coupled to a rotor position detector (72) and an input power detector (78) and receives a signal representing motor torque angle to develop a signal representing the estimated current drawn by the motor (12).

16 Claims, 5 Drawing Sheets

VSCF START SYSTEM MOTOR CURRENT ESTIMATOR

FIELD OF THE INVENTION

This invention relates to electrical motor controls and more particularly to a motor current estimator therefor.

BACKGROUND OF THE INVENTION

Conventional electrical power systems utilize a synchronous electrical generator for generating AC power. Particularly, such a generator may include a rotor and a stator having a stator coil. In applications such as an aircraft, the rotor is driven by an engine so that electrical power is developed in the stator coil. Owing to the variation in engine speed, the frequency of the power developed in the generator windings is similarly variable. This variable frequency power is converted to constant frequency power in a variable speed constant frequency (VSCF) system including a power converter which may develop, for example, 155/200 $V_{AC}$ power at 400 Hz. Such known converters are controlled by a generator/converter control unit (GCCU).

In order to provide aircraft engine starting, such known power systems have operated the generator as a motor. Specifically, an external power source is coupled through a start control to the generator to energize the stator coil and thus develop motive power to start the engine. The components required in such a start control increase the weight of the aircraft and take up valuable space. To minimize the size and weight of such start controls, certain known aircraft VSCF power systems have utilized the existing converter and GCCU for the start control.

In the start mode of operation, the converter may be supplied power from any 400 Hz power source, such as, for example, an auxiliary power unit generator or an external power source. However, each such power source might have a different available capacity for use in engine starting. Therefore, the GCCU must be configured to provide engine starting from any such available power sources and to limit the amount of power drawn.

Rozman et al. co-pending application entitled VSCF Start System with Selectable Input Power Limiting, Ser. No. 270,625, filed Nov. 14, 1988, and owned by the assignee of the present invention, which is hereby incorporated by reference herein, discloses a start control which provides input power limitations in accordance with input power requirements. Specifically, the start control described therein utilizes a pulse width modulated inverter to control torque and power as functions of the output voltage and commutation angle. Specifically, the start control maintains the volts/hertz ratio at a constant and uses closed loop control of the commutation angle at speeds above a preselected minimum to control current and to limit input power.

In order to control stator current it is necessary to provide feedback information representing actual current. This information is commonly obtained using a current sensing device to measure the actual current. Known measuring systems employ a shunt resistor, a current transformer or a hall sensor. Shunt resistors are practical only for low power motor control due to the additional power losses and weight. Current transformers are typically used to measure larger current levels at medium and high speeds. At low speeds, current transformers are less accurate. To overcome such inaccuracies, the size and weight thereof must be increased. Hall sensors are typically used to measure current at low speed. However, such sensors tend to be sensitive to the temperature range and they are of relatively large size.

Another problem resulting from the use of current sensors is the necessity of filtering the signals produced thereby. At low rotational speeds, a conventional scheme which uses amplitude detection requires a filter with a large time constant which limits the dynamic performance of the motor control system.

Rozman et al. co-pending application entitled VSCF Start System Current Estimator, Ser. No. 279,972, filed Dec. 5, 1988, discloses a current estimator which is used to develop a current feedback value. The current estimator is operable to calculate an estimate of motor current as a function of rotor speed and power drawn by the stator coil. Such a current estimator assumes that the volt/hertz ratio remains at a constant. In actuality, the voltage will vary as a function of DC link voltage. Therefore, it is desirable that a current estimator estimate the current to reflect such voltage variations.

The present invention is intended to overcome one or more of the problems as set forth above.

SUMMARY OF THE INVENTION

In accordance with the present invention, a motor control system provides an estimate of motor current to permit weight and size reduction of a typical motor control system.

Broadly, there is disclosed herein a current estimator for a motor having a rotor and stator having a stator coil which is energized from a source of power for imparting rotation to the rotor. The estimator includes first means for sensing the speed of rotational movement of the rotor, second means for sensing the power drawn by the stator coil from the source of power, and means for determining motor torque angle. Means are coupled to the first and second sensing means and the determining means for calculating an estimation of the current through the stator coil responsive to the rotor speed, the power drawn by the stator coil and the torque angle.

Specifically, the current estimator is coupled to a rotor position detector and an input power detector. Also, the current estimator receives a signal from the generator control unit representing a commutation angle command, which corresponds to motor torque angle at unity power factor. The current estimator develops a signal representing the estimated current drawn by the motor. The current drawn by the motor has been found to be equal to:

$$I_A = K_2 \cdot \sqrt{\frac{P_{in} - P_{loss}}{R_e + K_1 \cdot L_q \cdot \omega/\mathrm{tg}(\alpha)}}$$

where:

$K_2$=0.577;

$P_{in}$=input power applied to the converter;

$P_{loss}$=power due to the losses in the converter;

$R_e$=resistance of armature per phase;

$$K_1 = \text{no. of poles} \cdot \frac{\pi}{60};$$

$L_q$=quadrature axis synchronous inductance;

$\omega$=motor speed; and $\alpha$=torque angle (commutation angle).

According to another aspect of the invention, the current estimator forms part of a control for a motor which is controllably energized from the power source to control the motor.

According to still another aspect of the invention, the motor comprises a brushless DC motor which is energized from a source of DC power through a converter which includes an inverter circuit. The inverter circuit includes switches which are controllably energized and alternately apply positive and negative DC voltage to the stator coil for controlling motor operation.

In accordance with the above, it is an object of the present invention to provide a motor current estimation in a VSCF start control system employing motor position detection and input power detection to permit weight and size reduction of a typical VSCF start system.

It is another object of the present invention to detect the RMS magnitude of the motor current at low speeds without introducing a significant time delay.

Further features and advantages of the invention will readily be apparent from the specification and from the drawings.

DESCRIPTION OF THE INVENTION

Figure 1:
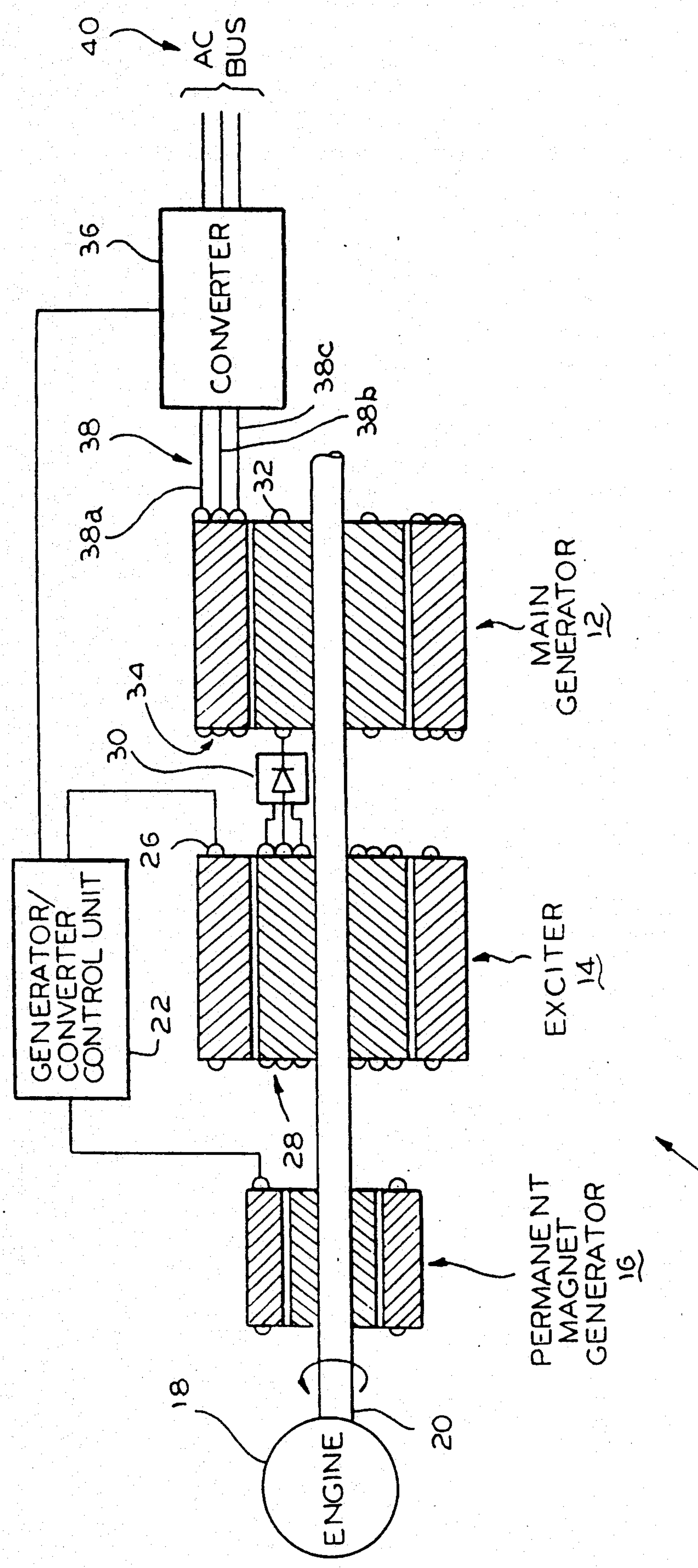
FIG. 1 is a combined diagrammatic illustration-block diagram of an electrical system incorporating the current estimator of the present invention.

Referring first to FIG. 1, an electrical power system 10 includes a main generator 12, an AC exciter 14 for providing main field current to the generator 12 and a permanent magnet generator (PMG) 16. Each of the main generator 12, exciter 14 and PMG 16 are driven by an engine 18 through a common shaft 20.

A generator/converter control unit (GCCU) 22 receives the power developed by the PMG and delivers a controlled current to a field winding 26 of the exciter 14. As is conventional in brushless power systems, rotation of the shaft 20 by the engine 18 results in generation of a polyphase voltage in armature windings 28 of the exciter 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator stator windings, or stator coil, 34. The stator windings 34 develop polyphase output power which is delivered to a converter 36 over a bus 38 comprising at least three conductors 38*a*, 38*b*, and 38*c*.

In a typical application, the engine 18 is the main engine in an aircraft, and the converter 36 is part of a variable speed constant frequency (VSCF) system for delivering constant frequency power to an AC bus 40 for powering aircraft loads (not shown), as controlled by the GCCU 22.

During engine start, the engine 18 is started using the main generator 12 operating as a motor. Particularly, the main generator 12 receives power from the converter 36 which is controlled by the GCCU 22. For ease of explanation herein, the main generator 12 is referred to as a motor when operated as such in the start mode of operation.

Figure 2:
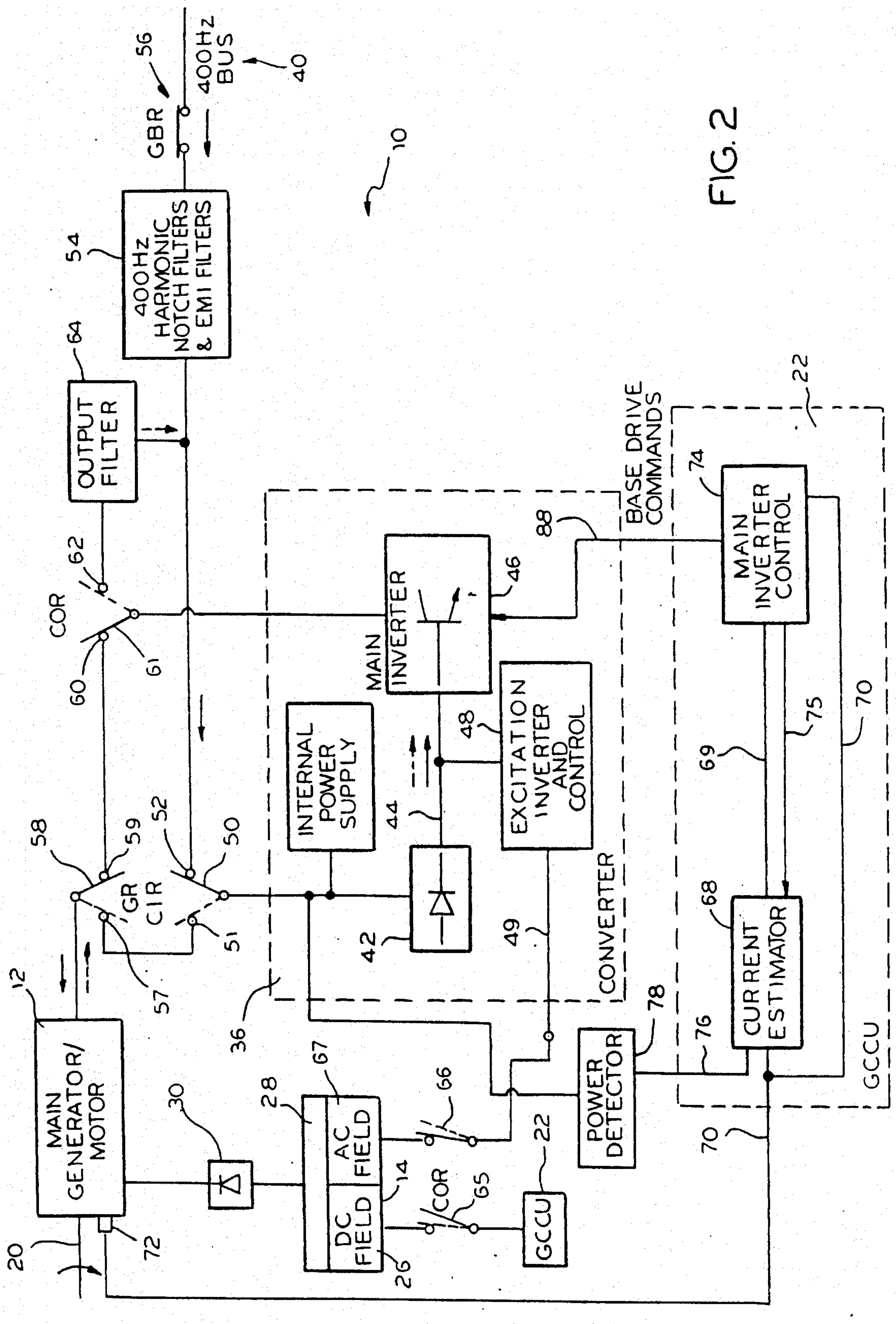
FIG. 2 is a generalized block diagram of the electrical power system including a control system for the generate mode of operation and the start mode of operation.

Referring now to FIG. 2, the electrical power system 10 is illustrated in greater detail in block diagram form.

The converter 36 includes an AC/DC converter 42 connected by a DC link 44 to a DC/AC converter 46. Particularly, according to the illustrated embodiment of the invention, the AC/DC converter 42 comprises a full wave bridge rectifier circuit of conventional construction which is operable to convert three phase AC power to DC power, the DC link 44 includes a conventional filter, and the DC/AC converter 46 comprises a main inverter circuit, described more specifically below relative to FIG. 4. The converter 36 also includes an excitation inverter and control 48 connected to the DC link 44 for developing AC power on a line 49 for the motor field during the start mode of operation.

The AC side of the rectifier 42 is connected to a movable contact 50 of a converter input relay (CIR). The relay CIR also includes respective first and second fixed contacts 51 and 52. The second fixed contact 52 is connected through a filter circuit 54 and generator bus relay (GBR) 56 to the AC bus 40. The first fixed contact 51 is connected to a first fixed contact 57 of a generator relay (GR). The GR relay also includes a movable contact 58 and a second fixed contact 59. The movable contact 58 is connected to the main generator 12, i.e., to the windings 34 shown in FIG. 1. The second fixed contact 59 is connected to a first fixed contact 60 of a converter output relay (COR). The COR relay also includes a movable contact 61 and a second fixed contact 62. The movable contact 61 is connected to the output of the main inverter 46. The second fixed contact 62 is connected through an output filter 64 to the filter circuit 54. The COR relay also includes respective first and second field control switches 65 and 66. The first switch 65 connects the exciter field winding 26 to the GCCU 22. The second switch 66 connects the excitation inverter and control 48 to an AC start field winding 67 of the exciter 14. Specifically, the excitation for the wound field main generator/motor 12 cannot be supplied at zero speed by the exciter 14. Accordingly, the excitation inverter and control 48 and the start field winding 67 are included functioning as a rotary transformer. Specifically, AC power delivered on the line 49 to the exciter AC field winding 67 develops corresponding AC power in the armature windings 28 for powering the motor field winding 32, see FIG. 1.

During engine start, the relays GR, CIR and COR are operated as shown in solid line in FIG. 2. Conversely, in the generate mode, these relays GR, CIR and COR are operated as shown in dashed line in FIG. 2.

Although the relays GR, CIR and COR are shown as providing a single line connection, each of the relays is provided with suitable switches to switch three phase power, as is well known.

The GCCU 22 includes a current estimator 68 which receives a rotor position signal on a line 70 from a rotor position sensor 72 associated with the main generator 12. The position sensor 72 may be, for example, a conventional resolver. The current estimator 68 also receives an input power signal on a line 76 from a power detector 78. The power detector 78 may be of any conventional form and is operable to sense the input power delivered to the converter 36 when operating in the start mode of operation. Finally, the current estimator 68 receives a commutation angle command signal on a line 75 from the main inverter control 74. The commutation angle command represents a desired commutation angle and is equal to the torque angle at unity power factor. The current estimator 68 develops a signal on a line 69 which represents an estimation of the current in the stator windings 34. The rotor position signal on the line 70 and the current signal on the line 69 are transferred to a main inverter control 74. The main inverter control 74 develops base drive commands on a line 88 for controlling the inverter 46.

In the generate mode of operation, three phase power developed by the main generator 12 is delivered through the GR relay movable contact 58, its first fixed contact 57, through the CIR relay first fixed contact 51 and its movable contact 50 to the rectifier 42. The rectifier 42 converts the three phase AC power to DC power which is transferred over the DC link 44 to the inverter 46 which converts the power to AC power of constant frequency. The constant frequency AC power from the inverter 46 is delivered through the COR relay movable contact 61 to the second fixed contact 62, through the output filter 64, and the filter 54 to the AC bus 40. Field power is developed by the AC exciter 14 utilizing the DC field winding 26 powered from the GCCU 22 through the first field control switch 65.

In the start mode of operation, the AC bus 40 is connected to any available power source. The AC power is delivered through the filter 54, to the second fixed contact 52 and movable contact 50 of the CIR relay to the rectifier 42. The AC voltage is then rectified and transferred through the DC link 44 to the main inverter 46 where it is converted to AC power. The AC power from the main inverter 46 is delivered through the movable contact 61 and the first fixed contact 60 of the COR relay, and subsequently through the second fixed contact 59 and movable contact 58 of the GR relay to the armature windings 34 of the main generator/motor 12. Field power to the main generator 12 is provided from the excitation inverter and control 48 through the second COR field control switch 66 to the exciter AC field winding 67, as discussed above.

Figure 3:
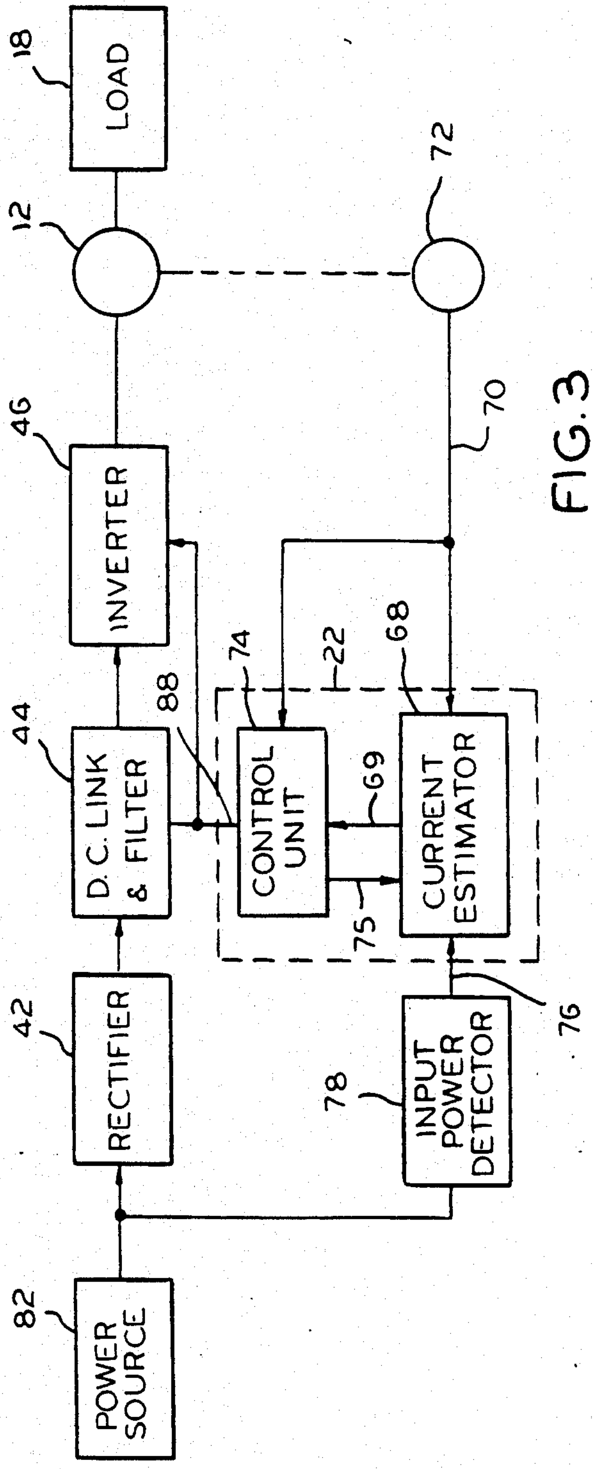
FIG. 3 is a block diagram of the control system specifically illustrating the start mode of operation.

Referring now to FIG. 3, a simplified block diagram representation more specifically illustrates the operation of the electrical power system 10 in the start mode of operation, as discussed immediately above. A power source 82 is coupled to the rectifier 42 which is coupled through the DC link and filter 44 to the main inverter 46. The GCCU 22 receives the input power feedback signal on the line 76 from the power detector circuit 78 which senses power delivered from the power source 82. The GCCU 22 also receive the position signal on the line 70 from the rotor position sensor 72. As discussed above, the GCCU 22 develops the base drive commands for the main inverter 46 on the line 88.

Specifically, the GCCU 22 includes the main inverter control unit 74 and the current estimator 68. A detailed description of the main inverter control unit 74 is not provided herein. The main inverter control unit 74 may be of any desired form which is operable to develop the base drive commands on the line 88 responsive to the estimated current feedback signal on the line 69 and the rotor position signal on the line 70, and to generate a signal representing commutation angle on the line 75. An example of such a main inverter control unit 74 is provided in the Rozman et al. co-pending application, Ser. No. 270,625, incorporated by reference herein.

The motor 12 described herein is commonly referred to as a brushless DC motor inasmuch as it is powered by alternately applying positive and negative DC signals to the stator coil. However, the power applied to the motor is in the form of AC power. Therefore, the current estimator 68 according to the invention could be utilized with any control system for operating an AC motor as well as the brushless DC motor disclosed herein, as will be obvious to those skilled in the art.

Figure 4:
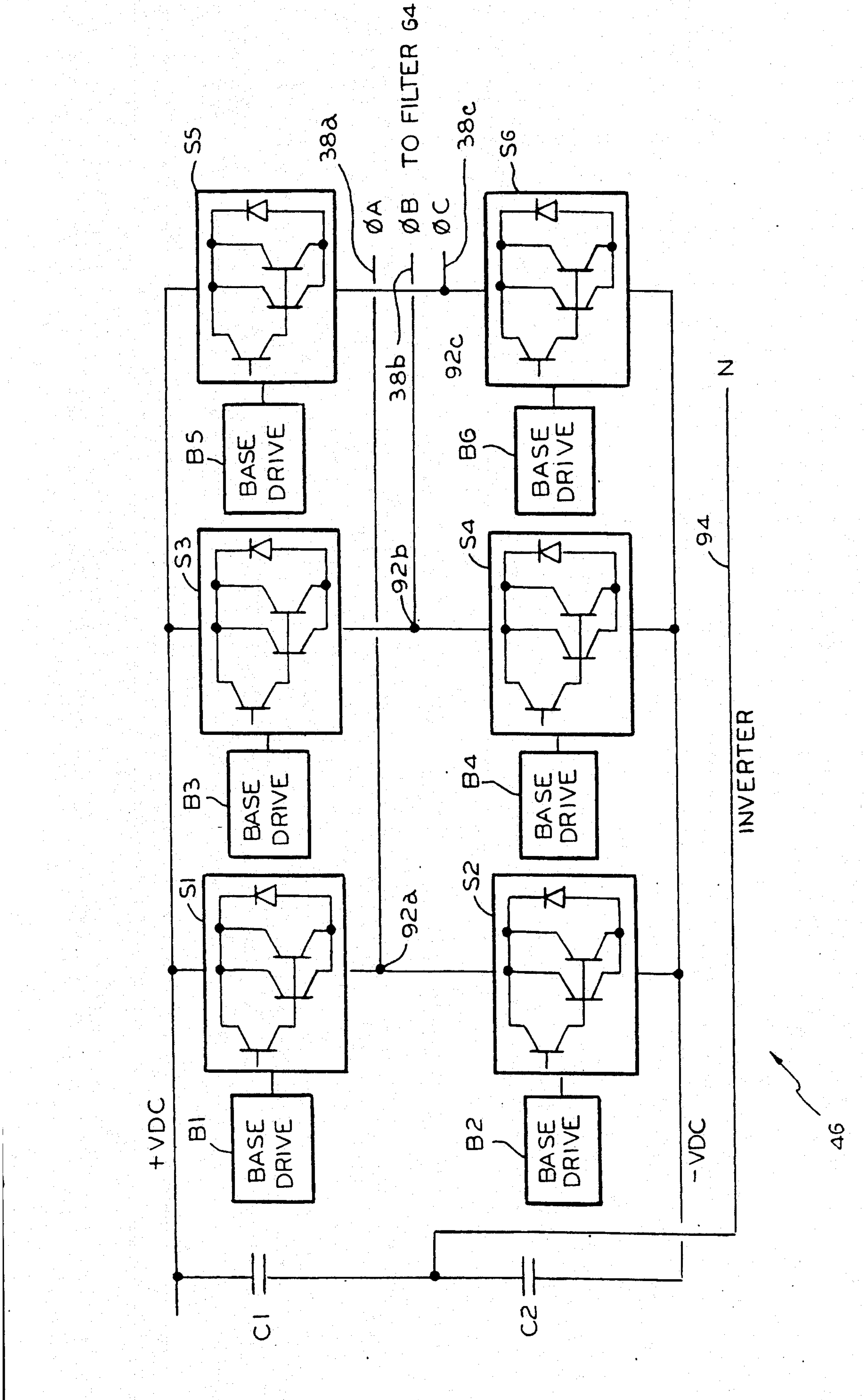
FIG. 4 is a schematic diagram illustrating the main inverter of FIG. 3.

Referring to FIG. 4, a schematic diagram illustrates one alternative circuit for the main inverter 46. Particularly, the inverter 46 is a voltage source inverter having six power switch circuits S1–S6. The six power switch circuits S1–S6 are connected in a 3-phase bridge configuration. Each of the power switch circuits S1–S6 is driven by an associated respective base drive circuit B1–B6. The base drive circuits B1–B6 are driven by the signals on the line 88 from the GCCU 22 in a conventional manner. The switch circuits S1–S6 are connected between the plus voltage DC rail and the minus voltage DC rail which comprise the DC link 44. The 3-phase armature windings 34 of the main generator 12 are connected by the lines 38*a*–38*c*, respectively, to junctions 92*a*–92*c* between pairs of series-connected switch circuits S1–S6. A neutral line 94 to the main generator 12 is connected at a junction between DC link filter capacitors C1 and C2 across the DC link rails.

Although not shown, the excitation inverter and control 48 may include an excitation inverter of generally similar construction to the main inverter 46 illustrated in FIG. 4. Alternatively, other circuits may be utilized for either or both of the main inverter 46 and the excitation inverter, as is well known.

Although no implementation for the control of the excitation inverter and control 48 is illustrated herein, reference may be had to the Rozman et al. co-pending application, Ser. No. 270,625, incorporated by reference herein, for illustrative embodiments thereof.

Figure 5:
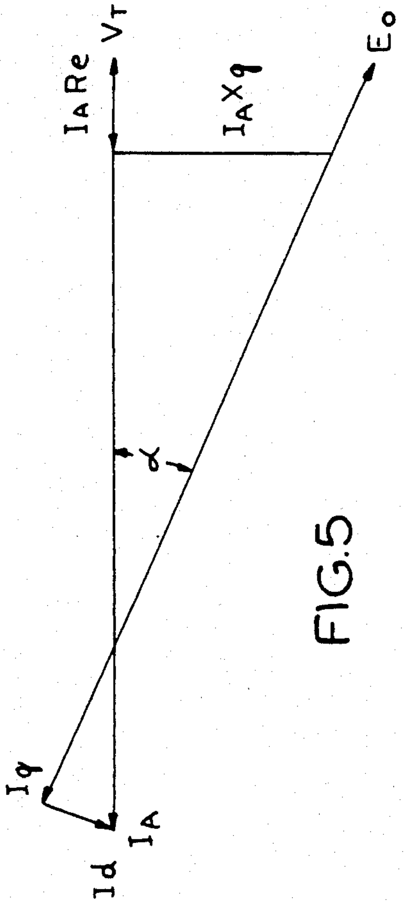
FIG. 5 is a vector diagram illustrating the desired relationship of various motor operation parameters utilized in estimating motor current.

With reference to FIG. 5, a vector diagram illustrates operation of the motor 12 operating at unity power factor. Particularly, the vector diagram illustrates the basic relationship between motor terminal voltage $V_T$ and torque angle $\alpha$. At unity power factor, the torque angle is equal to the commutation angle. More specifically, at unity power factor, the torque angle is determined in accordance with the following equation (1):

$$\alpha = \mathrm{arctg}\left(\frac{I_d}{I_q}\right)$$

where:

$I_d$—direct component of the armature current $I_A$; and $I_q$—quadrature component of the armature current $I_A$.

The terminal voltage per phase $V_T$ can be expressed with the following equation (2):

$$V_T = I_A \cdot R_e + \frac{I_A \cdot X_q}{\mathrm{tg}\,(\alpha)}$$

where:

$I_A$—motor armature current (stator current);

$\alpha$—torque angle (commutation angle);

$R_e$—resistance of armature per phase; and $X_q$—quadrature axis synchronous reactance.

The quadrature axis synchronous reactance $X_q$ can be expressed in accordance with the following equation (3):

$$X_q = K_1 \cdot \omega \cdot L_q$$

where:

$$K_1 = \text{no. of poles} \cdot \frac{\pi}{60};$$

$\omega$—motor speed, rpm: and $L_q$—quadrature axis synchronous inductance.

The power $P_{AC}$ applied to a three phase AC motor, operating at a unity power factor, is determined according to the following equation (4):

$$P_{AC} = 3 \cdot V_T \cdot I_A$$

where:

$V_T$—motor terminal voltage per phase; and $I_A$—motor armature current.

The power $P_{AC}$ is also determined in accordance with the following equation (5):

$$P_{AC} = P_{in} - P_{loss}$$

where $P_{in}$—input power applied to the converter 36; and $P_{loss}$—power due to the losses in the rectifier 42, DC link and filter 44, inverter 46, and the necessary conductors.

Substituting the equations (2), (3), and (5) into the equation (4) and solving for $I_A$ results in the following equation (6):

$$I_A = K_2 \cdot \sqrt{\frac{P_{in} - P_{loss}}{R_e + K_1 \cdot L_q \cdot \omega/\text{tg}(\alpha)}}$$

where: $K_2 = 0.577$.

The armature current can be accurately estimated utilizing the above equation.

Figure 6:
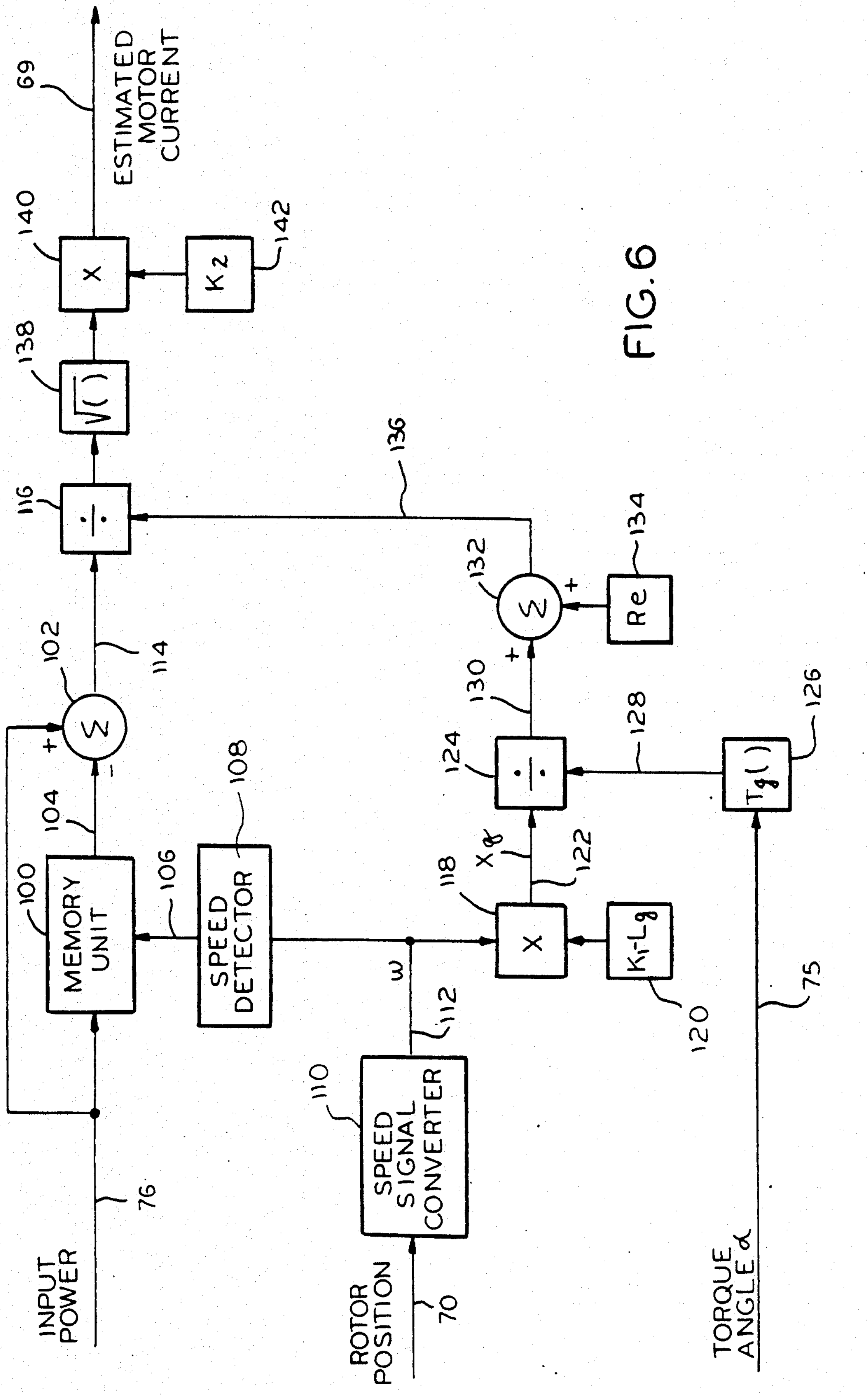
FIG. 6 is a more detailed block diagram of the current estimator of the generator/converter control unit of FIG. 3.

With reference to FIG. 6, a block diagram illustrates the implementation of the current estimator 68 of the GCCU 22, see FIG. 3, according to the invention.

The input power signal on the line 76 from the power detector 78, see FIG. 3, is applied to a first memory unit 100 and as an input to a first summer 102. The first memory unit 100 has an output on a line 104 which is also applied to the first summer 102. The first memory unit 100 receives a control input on a line 106 from a speed detector 108.

The rotor position signal on the line 70 is applied to a speed signal converter 110. The speed converter 110 may perform a derivative operation for converting rotary position to speed, as is well known, and develops a speed signal on a line 112.

The speed detector 108 receives the speed signal on the line 112 and develops the control signal on the line 106 to indicate if the motor is in a stalled condition or is rotating at or above a preselected low speed setpoint. Particularly, if the motor is stalled, then none of the sensed power is used by the motor 12, but instead represents power losses in the converter 36. The memory unit 100 is controlled in accordance with the control signal on the line 106 to output the level of the input power signal received on the line 76 to the first summer 102 at speeds below the setpoint. Once the setpoint speed is achieved, the memory unit 100 stores the value of the input power signal on the line 76 at the set point speed, and outputs the stored value when the rotor is operating at speeds above the setpoint speed. Accordingly, the signal on the line 104 represents the power loss factor $P_{loss}$.

The first summer 102 subtracts the power losses from the input power to develop an input signal on a line 114, representing the fifth equation (5), above, to a divider 116.

The motor speed signal on the line 112 is also applied to a first multiplier 118. The first multiplier 118 also receives a constant value determined in accordance with the equation $K_1 \cdot L_q$ from a block 120 and calculates the product $X_q$ of the third equation (3) on a line 122. The value $X_q$ on the line 122 is provided to a divider 124.

The torque angle $\alpha$ is represented by the signal received on the line 75 from the main inverter control 74 and is applied to a tangent block 126 which develops an output signal on a line 128 representing the tangent of the torque angle. The signal on the line 128 is also applied to the second divider 124. The output of the divider 124 is a signal on a line 130 representing the quotient $X_q/\text{tg}(\alpha)$ which is applied to one input of a third summer 132. The third summer 132 also receives a constant $R_e$ from a block 134. The constant $R_e$ represents the armature per phase resistance, discussed above. The output of the third summer 132 is a signal on a line 136 representing the divisor in the sixth equation (6) above, namely $R_e + K_1 \cdot L_q \cdot \omega/\text{tg}(\alpha)$ which is also applied to the first divider 116.

The output of the divider 116 is applied to a square root block 138 which is in turn connected to a second multiplier 140. The multiplier 140 also receives a constant $K_2$ from a block 142 and develops the output on the line 69 proportional to the estimated AC motor current as determined in accordance with the sixth equation (6), above.

Thus, according to the present invention as described and illustrated hereinabove, the AC motor current is estimated by using input power feedback, motor speed, and torque angle, which permits the elimination of motor current sensors, resulting in a reduction of weight and size of the motor control system, and more accurately compensates for variations in motor voltage.

The estimated current value represents an estimation of instantaneous current. Such current measurement does not require filtering. Therefore, in accordance with the invention, by estimating the RMS value of instantaneous motor current, large delays resulting from the use of filtering devices is eliminated and dynamic motor performance is improved.

The GCCU 22 described herein is implemented in a conventional software programmed microprocessor unit including suitable memory circuits, as is well known. Alternatively, the GCCU 22 described herein could be implemented with suitable electrical or electronic circuits.

Thus, the invention broadly comprehends a motor control employing current estimation.

We claim:

1. A current estimator for a motor having a rotor and a stator having a stator coil which is energized from a source of power for imparting rotation to the rotor, comprising:

first sensing means for sensing the speed of rotational movement of the rotor;

second sensing means for sensing the power drawn by the stator coil from the source of power;

means for determining motor torque angle; and means coupled to said first and second sensing means and said determining means for calculating an estimation of the current through the stator coil responsive to said rotor speed, said power drawn by the stator coil, and said torque angle.

2. The current estimator of claim 1 wherein the stator coil is energized by the source of power through a converter, and said second sensing means senses the input power applied to the converter, and said calculating means includes means for determining the power losses in the converter.

3. The current estimator of claim 1 wherein said calculating means includes means for determining motor reactance responsive to said rotor speed.

4. The current estimator of claim 1 wherein said calculating means provides an instantaneous estimation of the current through the stator coil.

5. A control for a brushless electro-motive machine having a rotor and a stator having a stator coil which is controllably energized from a source of power for imparting rotation to the rotor, comprising:

first sensing means for sensing the speed of rotational movement of the rotor;

second sensing means for sensing the power drawn by the stator coil from the source of power;

means for determining motor torque angle;

means coupled to said first and second sensing means and said determining means for calculating an estimation of the current through the stator coil responsive to said speed of the rotor, said power drawn by the stator coil, and said torque angle; and control means coupled to said calculating means for controllably energizing the stator coil responsive to the current estimation.

6. The control of claim 5 wherein the stator coil is energized by the source of power through a converter, and said second sensing means senses the input power applied to the converter, and said calculating means includes means for determining the power losses in the converter.

7. The control of claim 5 wherein said determining means comprises means for receiving a commutation angle command from said control means.

8. The control of claim 5 wherein said calculating means provides an instantaneous estimation of the current through the stator coil.

9. The control of claim 5 wherein said control means comprises an inverter and an inverter control operable to control operation of said inverter responsive to said current estimation.

10. The control of claim 5 wherein said calculating means includes means for deriving the estimation of motor current in accordance with the following equation $$I_A = K_2 \cdot \sqrt{\frac{P_{in} - P_{loss}}{R_e + K_1 \cdot L_q \cdot \omega/\mathrm{tg}(\alpha)}},$$

where:

$K_2=0.577$;

$P_{in}$32 power from the source of power;

$P_{loss}$=power due to the losses in the control means;

$R_e$=resistance of stator coil;

$$K_1 = \text{no. of poles} \cdot \frac{\pi}{60};$$

$L_q$=quadrature axis synchronous inductance;

$\omega$=rotor speed; and $\alpha$=torque angle.

11. A start control for a motor having a rotor and a stator having a stator coil which is controllably energized from a source of DC power defining a positive and a negative DC voltage for imparting rotation to the rotor, comprising:

first sensing means for sensing the speed of rotational movement of the rotor and generating a signal representative thereof;

second sensing means for sensing the power drawn by the stator coil from the source of DC power and generating a signal representative thereof;

switching means coupled between the source of DC power and the stator coil for alternately applying a positive and a negative voltage to the stator coil;

means for developing a signal representing motor torque angle;

means coupled to said first and second sensing means and said developing means for generating a signal representing an estimation of the current through the stator coil responsive to said rotor speed, said power drawn by the stator coil, and said torque angle; and control means coupled to said generating means for controllably operating said switching means responsive to the current estimation.

12. The start control of claim 11 wherein said second sensing means senses the input power applied to said switching means, and said generating means includes means for determining the power losses in said switching means.

13. The start control of claim 11 wherein said generating means comprises means for receiving a commutation angle command from said control means.

14. The start control of claim 11 wherein said generating means provides an instantaneous estimation of the current through the stator coil.

15. The start control of claim 11 wherein said switching means comprises an inverter and said control means includes an inverter control operable to control operation of said inverter responsive to said current estimation.

16. The start control of claim 11 wherein said generating means includes means for deriving the estimation of motor current in accordance with the following equation $$I_A = K_2 \cdot \sqrt{\frac{P_{in} - P_{loss}}{R_e + K_1 \cdot L_q \cdot \omega/\mathrm{tg}(\alpha)}},$$

where:

$K_2=0.577$;

$P_{in}$=power from the source of power;

$P_{loss}$=power due to the losses in the switching means;

$R_e$=resistance of stator coil;

$$K_1 = \text{no. of poles} \cdot \frac{\pi}{60};$$

$L_q$=quadrature axis synchronous inductance;

$\omega$=rotor speed; and $\alpha$=torque angle.

* * * * *